United States Patent
DeCormier

(10) Patent No.: US 6,712,644 B1
(45) Date of Patent: Mar. 30, 2004

(54) COAXIAL LINE SECTION ASSEMBLY AND METHOD WITH VSWR COMPENSATION

(75) Inventor: William A. DeCormier, Poland, ME (US)

(73) Assignee: SPX Corporation, Charlotte, NC (US)

( * ) Notice: Subject to any disclaimer, the term of this patent is extended or adjusted under 35 U.S.C. 154(b) by 0 days.

(21) Appl. No.: 10/446,104

(22) Filed: May 28, 2003

(51) Int. Cl.[7] .................................................. H01R 9/05
(52) U.S. Cl. ........................ 439/578; 333/260; 174/28; 174/88 C
(58) Field of Search ........................ 439/578; 333/260; 174/28, 88 C

(56) References Cited

U.S. PATENT DOCUMENTS

| 2,955,148 | A | * | 10/1960 | Graham et al. ........... 174/88 C |
| 3,492,604 | A | * | 1/1970 | Fan ............................. 333/33 |
| 3,976,352 | A | * | 8/1976 | Spinner ..................... 439/140 |
| 4,824,400 | A | * | 4/1989 | Spinner ..................... 439/578 |
| 4,831,346 | A | * | 5/1989 | Brooker et al. ............. 333/260 |
| 5,455,548 | A | * | 10/1995 | Grandchamp et al. ....... 333/260 |

FOREIGN PATENT DOCUMENTS

JP          3-179682          * 8/1991

* cited by examiner

*Primary Examiner*—Tho D. Ta
(74) *Attorney, Agent, or Firm*—Baker & Hostetler LLP

(57) ABSTRACT

A apparatus for joining coaxial line sections for high-power RF signals includes a feature that permits the impedance and the electrical profile of the inner joining element to remain comparatively uniform as the sections of coaxial conductor change dimensions with temperature. The apparatus for joining coaxial line sections further includes a feature in the outer joining element that compensates for impedance lumps caused by the nonuniform profile of the inner element at the joints.

27 Claims, 3 Drawing Sheets

COAXIAL LINE SECTION ASSEMBLY AND METHOD WITH VSWR COMPENSATION

FIELD OF THE INVENTION

The present invention relates generally to connecting high-power radio frequency coaxial line sections. More particularly, the present invention relates to motion compensating connection fittings, used, for example, for broadcasting.

BACKGROUND OF THE INVENTION

Radio-frequency (RF) broadcasting employs high power transmitting equipment that can drive transmitting antennas by way of multiple sections of coaxial line that can typically range in size, for example, from as small an inch or less in diameter to more than a foot in diameter. The sections of coaxial line can be individually on the order of twenty feet in length, terminated for example with welded-on, bolt-together flanges on the outer conductors on each end, and with pressed-in-place inner conductor joining fittings providing inner conductor continuity. Since distances between transmitters and antennas can be as much as or more than 2000 feet, it is possible to have 100 or more junctions between line sections in a full system. The connecting fittings may be required to provide structural support to the transmission line, hold the inner conductor in its location, and provide an at least moderately effective seal of the coaxial line against moisture, oxygen, pollutants, and other potential contaminants, as well as affording a low-loss bridging apparatus for transferring RF between sections.

Each joining fitting in a system is efficient to some degree at passing RF between sections. Inefficiencies at junctions may appear as heating at the joint, or may take the form of reflected RF variously returning to the transmitter or interacting with the RF that continues to come from the transmitter. The interaction can cause loss of purity in the broadcast signal, while the transmitter itself is susceptible to damage from reflected signals that reenter the output apparatus.

In the high-power RF transmission environment, each section of coaxial transmission line may be built from two concentric, substantially rigid tubes made from a high-conductivity material such as copper or a copper alloy, with the inner conductor held in place by nonconductive spacers. The spacers may be made from materials chosen for electrical, mechanical, and process properties that combine desirable minimization of effect on RF transmission with high reliability and low cost. The conductive tubes forming the coaxial line will in some instances have thermal properties similar to each other, such as their coefficients of thermal expansion, but can be subjected to unequal heat loads, such as wind chill and solar irradiance, as well as differential current density, that can cause the concentric tubes to exist at different temperatures. Over hundreds of feet, such temperature differences can manifest as length errors. These can lead to mechanical stresses manifesting as flexing of inner conductors causing deviation in impedance and can cause loci within the coaxial lines to exhibit high VSWR.

Prevention of such deviations has led to development of many designs for slip joints for inner conductors. Some such inner conductor joint designs have noticeably irregular outer surface profiles, which appear to propagating RE as lumped impedances. Joining of outer conductors using a flange that has a uniform inner surface may not minimize the overall voltage standing wave ratio (VSWR) of such a joint.

Accordingly, there is a need to provide joining apparatus for high-power RF coaxial transmission lines that at least to some extent reduces losses and reflections. The desirability of such joining apparatus is further enhanced by features that compensate for differential thermal expansion between outer conductors and inner conductors while maintaining a low-loss environment.

SUMMARY OF THE INVENTION

The foregoing needs are met, to a great extent, by the present invention, wherein in one aspect an apparatus and method is provided that in some embodiments minimizes voltage standing wave ratio (VSWR) in a high-power RF coaxial line joint at least to some extent or avoids impedance variations associated with inner conductor motion at the joint, at least to a degree.

Some embodiments of the present invention incorporate a reactive step into the shape of a coaxial outer conductor at a joint between sections in order to compensate for a reactive step in the coaxial inner conductor at the joint. The added step introduces a compensating impedance variation.

In accordance with one embodiment of the present invention, a joining apparatus for coaxial line comprises an inner conductor junction fitting fixed to a first coaxial line inner conductor and free to move longitudinally with respect to a second coaxial line inner conductor while maintaining electrical continuity therewith; a transverse ridge component of the inner conductor junction fitting that provides spring-loaded electrical and mechanical continuity between the inner conductor junction fitting and the second coaxial line inner conductor; a first outer conductor mating flange fixed to the outer conductor of a first coaxial line section; a second outer conductor mating flange fixed to the outer conductor of a second coaxial line section; and an impedance adapting shape forming an integral part of the second outer conductor flange, wherein the impedance adapting shape introduces an impedance variation that compensates for the impedance variation caused by the transverse ridge component of the inner conductor junction fitting.

In accordance with another aspect of the present invention, an apparatus for connecting segments of high-power radio frequency signal coaxial conductor comprises means for coupling inner conductor elements of coaxial lines electrically and mechanically; means for compensating for longitudinal motion between the coupled inner conductor elements; means for electrically coupling outer conductor elements of coaxial lines; and means for compensating for diameter irregularities in the outer surface of the inner conductor coupling means with offsetting diameter alterations in the inner surface of the outer conductor coupling means.

In accordance with still another aspect of the present invention, a low-VSWR method for joining coaxial signal conductors comprises coupling the elements that comprise the inner conductor using joints that permit relative axial travel on one side of the coupling plane to afford compensation for differential expansion between inner and outer conductors; maintaining a substantially unchanging electrical profile at the site of longitudinal travel of the moving element of the inner conductor through positioning of a spring assembly to cover the end of the moving element for all positions of the moving element; coupling the elements that comprise the outer conductor using structurally robust mounting flanges indissolubly attached to the outer conductor elements being coupled; and shaping the internal profile of the outer conductor mounting flanges in such fashion that the profile introduces impedance variations that mirror and compensate for those introduced by the external profile variations of the inner conductor coupling elements.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
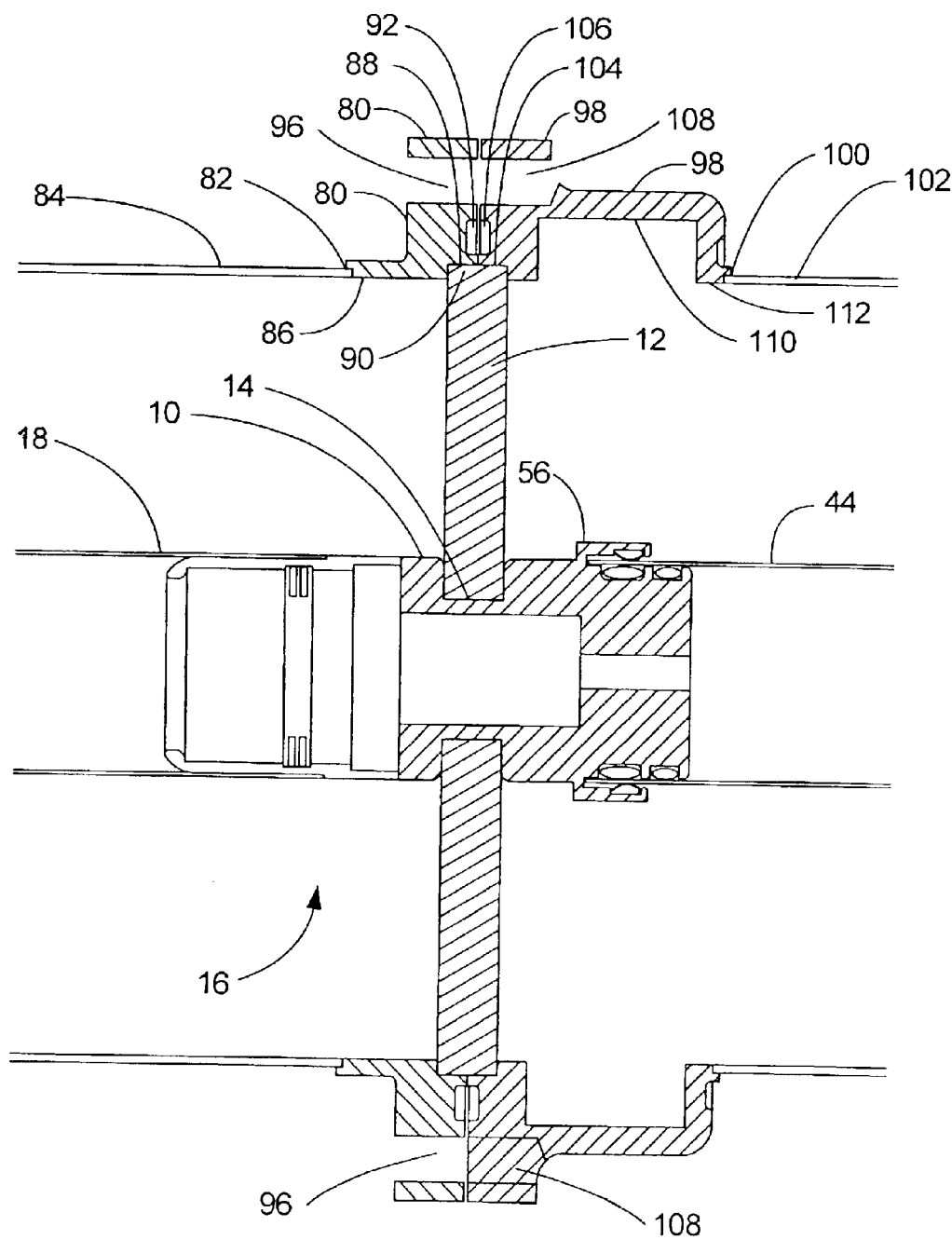
FIG. 1 is a cross section illustrating an expansion joining apparatus according to a preferred embodiment of the invention.

An embodiment in accordance with the present invention provides minimization of VSWR and minimization of effective impedance variation at joints between sections of high-power RF coaxial lines by providing a desirable RF profile at each joint.

Because the inner conductors of large air-dielectric coaxial lines can differ sin length relative to the outer conductors due to thermal effects, compensating joints are generally needed. These joint mechanisms tend to have multiple changes in diameter, as they serve not only to secure the center of a dielectric spacer, commonly called an anchor insulator, whose outer rim is customarily captured between the mating flanges of the outer conductor junction, but also to attach rigidly to the inner conductor tubing on one side of the joint and to insert with sliding contact into the inner conductor tubing on the other side of the joint.

Inner conductor joint designs that add additional performance features, such as providing a profile that shrouds the end of the inner conductor at all positions of thermal expansion, can have a circumferential bulge as well as a recess for anchor insulator clamping. These irregularities manifest as capacitances (the bulges) and inductances (the recesses) to the incident RF.

Outer conductor joint flanges are generally welded or otherwise permanently attached to the outer conductor ends that they link. As with the inner conductor joint bodies, recesses that increase the internal volume of the coax are inductive, while intrusions into the volume are capacitive. Thus, the recesses in both the inner and outer joint fittings that trap the anchor insulator both create inductances.

Another influential phenomenon is the intrinsic capacitance of the anchor insulator itself. This can be minimized by reducing the volume of dielectric material and positioning the material for minimum effect, but the presence of the anchor insulator or some equivalent method of locating the inner conductor at each joint and supporting the entire inner conductor throughout the vertical extent of the coaxial line may require compensation. The inductive recesses that trap the anchor insulator thus also tend to offset its capacitance.

Maintaining constant impedance throughout a coaxial line is desirable. The impedance of each segment along a coaxial line is modeled by the equation $$Z_{coax} = \frac{60}{\sqrt{\varepsilon_r}} \ln\left(\frac{R_{outer}}{R_{inner}}\right) \qquad (1)$$

where $Z_{coax}$ is the impedance of the coaxial line; $\varepsilon_r$; is the relative dielectric constant of the material—in this case, air, which has a dielectric constant differing from that of a vacuum by less than 600 ppm; $R_{outer}$ is the inner radius of the outer conductor; and $R_{inner}$ is the outer radius of the inner conductor. In order to make the impedance as nearly constant as possible, for example at a lump where the diameter of the inner conductor increases, an increase in the diameter of the outer conductor may be required at approximately the same point.

An additional factor in design is termed fringe capacitance. At a diameter transition, such as an edge where a groove starts or ends, there is a measurable capacitance. This term may be considered in developing an embodiment of the present invention.

Compensating for all of the above-described factors tends to improve the performance of each joint. The presence of as many as two hundred joints in a typical coaxial line between a transmitter and an antenna means that a loss at each joint, however small, in being replicated many times may accumulate sufficient error to cause a system to fail to achieve its design goals.

The invention will now be described with particular reference to the drawing figures, in which like reference numerals refer to like parts throughout. A preferred embodiment of the present inventive apparatus is illustrated in section in FIG. 1. An inner conductor fitting 10 captures an anchor insulator 12 in a central groove 14. The inner fitting 10 has a first end 16 sized to lit firmly into a first segment of inner conductor tubing 18 so that the inner fitting 10 and the first tubing 18 are effectively a single unit, particularly as contrasted with the opposite end of the inner fitting 10.

Figure 2:
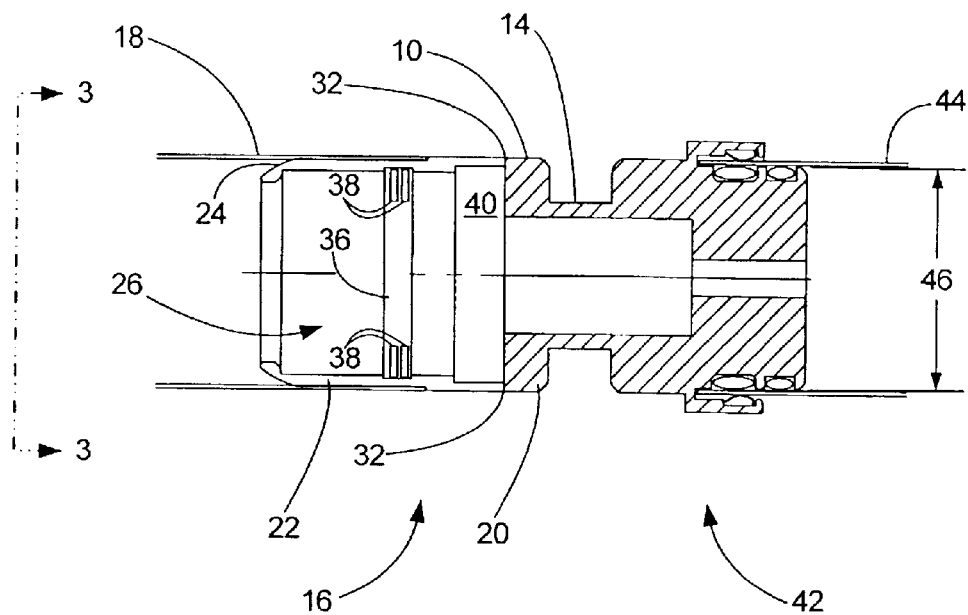
FIG. 2 is an enlarged section view of a part of the inner contact of the joining apparatus.

FIG. 2 is an enlarged sectional view of the inner conductor fitting that shows the above details and further illustrates the first end 16 of the inner conductor fitting having a first region 20 that can be essentially equal in diameter to the outer diameter of the first inner conductor tubing 18 and a second region 22 that can be of sufficiently reduced diameter to allow the first inner conductor tubing 18 to fit over the second region 22. The second region 22 of the first end 16 further can have a chamber 24 at its extremity to simplify initial assembly.

Figure 3:
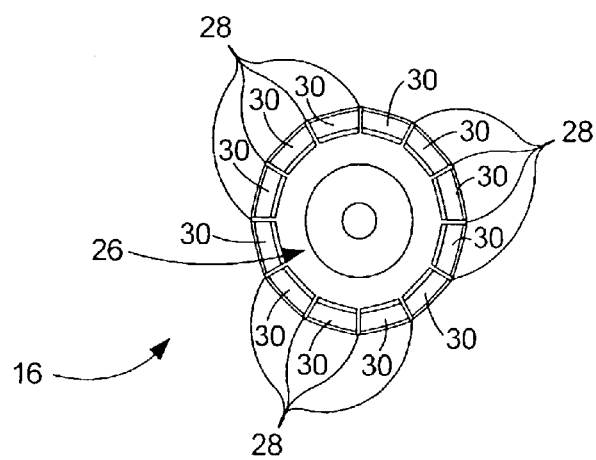
FIG. 3 is an end view of the inner contact of FIG. 2.

FIG. 3 is an end view that shows additional details. The first end 16 further may have a first recess 26 within and may be slotted radially with a multiplicity of slots 28 dividing the first end into axial fingers 30. These slots 28 may be of approximately equal depth of penetration 32, as shown in FIG. 2. A first groove 36 within the first recess 26 can provide spring retention, such as by one or more snap rings 38, which can provide continuous outward pressure to enhance electrical and mechanical contact between the fingers 30 and the first inner conductor tubing segment 18. A second groove 40 within the first recess 26 can reduce flexing stiffness, which can increase the force exerted by the spring 38 on the inner diameter of the first inner conductor tube 18.

Figure 4:
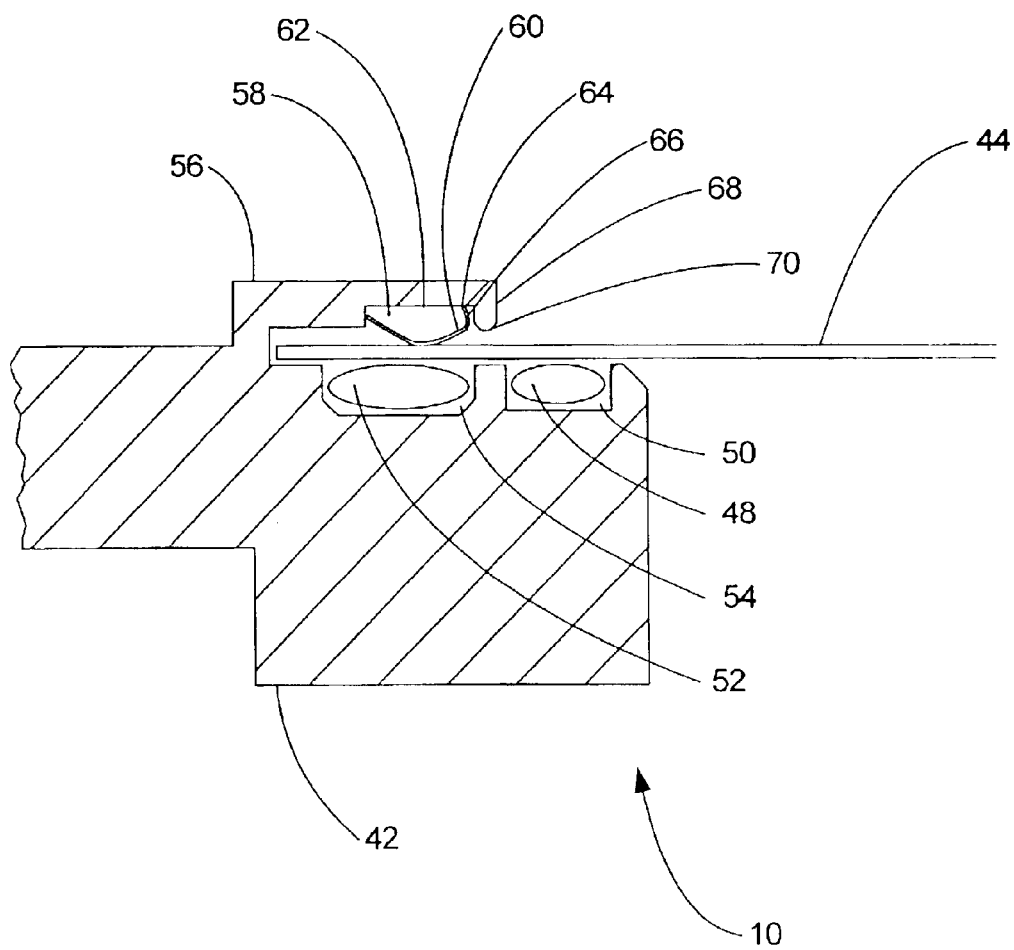
FIG. 4 is a further enlarged section view showing one type of spring used in the cup recess.

As shown in FIG. 4, a second end 42 of the inner fitting 10 has a series of features that enable its connection with a second inner conductor tubing segment 44 to allow sliding motion and to maintain to some extent substantially constant impedance during motion. To permit sliding motion, the second end 42 may have an overall diameter (reference numeral 46 in FIG. 2) smaller than the minimum size of the second tubing 44 in the region where the second tubing 44 surrounds the second end 42. A preferred embodiment may employ a first metallic spring 48 resting in a first groove 50 in the second end 42 and a second metallic spring 52 resting in a second groove 54 in the second end 42, or may employ pieces of resilient, low-friction insulating material, such as washers made from polytetrafluoroethylene (PTFE, known by trade names Teflon®, Dyneon™, etc.) in place of one or both of the metallic springs 48 and 52. The use of two metallic springs 48 and 52 can provide redundancy in some embodiments; a single spring or resilient insulator in a single groove may provide adequate service in some embodiments.

FIG. 4 shows that the region of the second end 42 of the inner fitting 10 over which the second inner conductor tubing segment 44 fits terminates in a raised cup 56. This raised cup 56 provides a cup recess 58 into which the second inner conductor tubing 44 can slide to a greater or lesser extent as manufacturing and thermal variations cause the position of the end of the second inner conductor tubing 44 proximal to the joint 10 to be different from a nominal position. Also housed within the raised cup 56 is a conductive finger spring fitting 60. The spring 60 can provide a substantially constant force against the outer surface of the second tubing 44, as well as against the opposing wall 62 of the cup recess 58. The spring 60 further can provide a substantially constant impedance for radio signal propagation within the cup recess 58, as it can provide a comparatively invariant electrical path for the second inner conductor tubing 44 that ends at the points of contact 64 of the spring 60. The electrical path can thus be made to be comparatively insensitive to the extent of insertion of the second inner conductor tubing 44 into the cup recess 58.

The style of spring 60 employed in the preferred embodiment may for example be continuous spring finger stock curved on the outer (fingertip) end 66 and wrapped around the circumference of the inner conductor fitting 10 to fit inside the cup recess 58. A lip 68 protects the outer ends 66 from being damaged during second inner conductor tubing 44 insertion, while a cup chamber 70 eases initial assembly.

FIG. 1 further shows that the first outer conductor flange 80 can have a first outer conductor junction area 82 that provides for welding or other attachment to the first outer conductor 84 that can be permanent. The inner diameter 86 of the first outer flange 80 can be essentially identical to the inner diameter of the first outer conductor 84, resulting in virtually no introduced reflection from that junction. The first outer flange 80 further can have a recess 88 that captures about half of the outer rim 90 of the anchor insulator 12 in the preferred embodiment. The first outer flange 80 also can have an o-ring groove 92 that similarly provides for the capture of about half of a sealing o-ring.

Each connection between pairs of outer flanges can be accomplished using bolts in a set of holes 96 located in a hole circle. The diameter of the hole circle may be one prescribed by Electronics Industry Association (EIA) specifications RS-225 and RS-259 for a particular size of coax outer conductor, or may be of some other variation of a bolted or boltless flange suited to a specific application.

The second outer conductor flange 98 can have a second outer conductor junction area 100 that provides for welding or other attachment to the second outer conductor 102 that can be permanent. The inner diameter 112 of the second outer flange 98 can be essentially identical to the inner diameter of the second outer conductor 102, resulting in virtually no introduced reflection from that junction. The second outer flange 98 further can have a recess 104 that captures about half of the outer rim 90 of the anchor insulator 12 in the preferred embodiment. The second outer flange 98 also can have a second o-ring groove 106 that similarly provides for the capture of about half of a sealing o-ring, and a set of holes 108 located in a hole circle of a diameter prescribed by Electronics Industry Association (EIA) specification RS-225 and RS-259, or of some other variation of a bolted or boltless flange suited to a specific application.

In addition to the above features, the second outer conductor flange 98 can have an enlarged step 110 corresponding to the raised cup 56 in the inner fitting 10. The dimensions of the enlarged step 110 are determined in part by the goal of keeping the impedance of the coaxial line as uniform as possible through the joint region, as defined by equation 1, in part by the further goal of keeping radii of curvature as large as practical to minimize arcing at high voltages, in part by simulations and mathematical models of capacitances and inductances resulting from irregularities in transmission lines, and in part by fabrication and testing.

In an alternative embodiment, the entire o-ring groove may be located in one of the outer conductor flange surfaces perpendicular to the longitudinal axis of the coaxial line. In that embodiment, the o-ring rests within the groove and is pressed by the mating process against a flat surface on the other flange.

Similarly, the entire anchor insulator recess may be located in one of the outer conductor flanges, and the anchor insulator pressed into place against a flat surface on the other flange.

In yet another embodiment, a junction of a pair of flanges may include mating male and female elements with faces parallel to the longitudinal axis of the coaxial line. A circumferential groove in one of the elements may permit the installation of an o-ring, so that joining the two elements provides a seal that can be somewhat independent of the pressure provided by the bolts joining the flanges, depending instead on the closeness of fit of the mating elements and the thickness and resilience of the o-ring.

Typical EIA RS-225 and RS-259 compatible flanges as well as other variations of a bolted or boltless flange suited to a specific application feature pass holes on the hole circles and use nuts and bolts for assembly. The preferred embodiment may use threaded holes in the second outer conductor flange 98 in place of loose nuts. An alternative embodiment can locate the enlarged step 110 further away from the flange joint longitudinally to provide for the use of more typical fasteners; another alternative embodiment can use a longer, lower profile enlarged step 110 to provide performance similar to that of the preferred embodiment, while still another alternative embodiment can use a larger diameter bolt hole circle to clear the enlarged step 110.

The many features and advantages of the invention are apparent from the detailed specification; thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to that fall within the scope of the invention.

What is claimed is:

1. An apparatus for joining a first coaxial line section having a first inner conductor and a first outer conductor to a second coaxial line section having a second inner conductor and a second outer conductor, comprising:
    an inner conductor junction fitting substantially fixed to the first coaxial line inner conductor and free to move longitudinally with respect to the second coaxial line inner conductor while maintaining electrical continuity therewith;
    a transverse ridge component on said inner conductor junction fitting that provides spring-loaded electrical and mechanical continuity between said inner conductor junction fitting and the second coaxial line inner conductor;
    a first outer conductor mating flange fixed to the first coaxial outer conductor line section;
    a second outer conductor mating flange fixed to the second coaxial outer conductor line section; and
    an impedance adapted shape that forms an integral part of said second outer conductor flange, wherein said impedance adapted shape introduces an impedance variation that compensates for the impedance variation caused by said transverse ridge component of said inner conductor junction fitting.

2. The apparatus for joining coaxial line sections of claim 1, further comprising:
    a first mating face, integral with said first outer conductor mating flange, wherein said mating face of said first outer conductor mating flange lies in a plane perpendicular to the axis of RF propagation of the coaxial line; and
    a second mating face, integral with said second outer conductor mating flange, wherein said mating face of said second outer conductor mating flange lies in a plane perpendicular to the axis of RF propagation of the coaxial line and is so oriented as to permit mating with said first mating face when the elements of the apparatus for joining coaxial line sections are assembled.

3. The apparatus for joining coaxial line sections of claim 1, further comprising a single, common mounting hole pattern in said first outer conductor mating flange and said second outer conductor mating flange, the holes of said hole pattern falling at uniform intervals on a circle around the longitudinal axis of the apparatus, the holes of said hole pattern allowing a set of fasteners to be applied parallel to the longitudinal axis of the apparatus in order to assemble said mating first flange and second flange.

4. The apparatus for joining coaxial line sections of claim 1, further comprising a groove in each of said first flange and second flange of such dimensions as to provide half of the depth required to capture a sealing o-ring between the mating faces of said first flange and second flange.

5. The apparatus for joining coaxial line sections of claim 1, further comprising a groove in said first flange of such dimensions as to provide the depth required to capture a sealing o-ring between the mating faces of said first flange and said second flange.

6. The apparatus for joining coaxial line sections of claim 1, further comprising a groove in said second flange of such dimensions as to provide the depth required to capture a sealing o-ring between the mating faces of said second flange and said first flange.

7. The apparatus for joining coaxial line sections of claim 1, further comprising:
    an axisymmetric offset region in said second outer conductor mating flange, said offset region being generally proximal to the transverse ridge in said inner conductor junction fitting and of such dimensions as to so interact with said transverse ridge as to establish electrical impedance in the frequency band of interest substantially equal to that of the coaxial line segments for which said apparatus for joining coaxial line sections serves as a joining element.

8. The apparatus for joining coaxial line sections of claim 1, further comprising:
    an axisymmetric offset region in said inner conductor junction fitting surrounding a spring-urged pressure contact mechanism establishing normal contact between said inner conductor junction fitting and said second inner conductor, said second inner conductor offset region exhibiting capacitive reactance in the frequency band of interest for the apparatus for joining coaxial line sections; and
    an axisymmetric stepped region in said second outer conductor mating flange, generally longitudinally collocated with said inner conductor offset region, said stepped region exhibiting inductive reactance in the frequency band of interest for the apparatus for joining coaxial line sections.

9. The apparatus for joining coaxial line sections of claim 1, further comprising a joint establishing electrical continuity between said inner conductor junction fitting and said first inner conductor, where said joint functions as an immobile electrical and mechanical connection during normal operation of the assembled coaxial line.

10. The apparatus for joining coaxial line sections of claim 1, further comprising a cup, integral with said inner conductor junction fitting, into which cup the second inner conductor element is free to insert and withdraw, said cup providing a mounting for a finger stock spring composed of a multiplicity of elements capable of providing electrical continuity between said second inner conductor element and said cup.

11. The apparatus for joining coaxial line sections of claim 1, further comprising a cup, affixed to said inner conductor junction fitting, into which cup the second inner conductor element is free to insert and withdraw, said cup providing a mounting for a finger stock spring composed of a multiplicity of elements capable of providing electrical continuity between said second inner conductor element and said cup.

12. The apparatus for joining coaxial line sections of claim 1, further comprising a cup, integral with said inner conductor junction fitting, into which cup the second inner conductor element is free to insert and withdraw, said cup providing a mounting for a cup contact spring capable of providing electrical continuity between said second inner conductor element and said cup, where the axis of the cup contact spring is circumferential and lies within said cup.

13. The inner conductor junction fitting of claim 1, further comprising a first circumferential groove in which a first contact spring can rest between and provide mechanical positioning support to said inner conductor junction fitting and said second inner conductor element, where the contact spring is fitted between the innermost surface of said groove and the inner surface of said second inner conductor element.

14. The inner conductor junction fitting of claim 1, further comprising a second circumferential groove in which a second contact spring can rest between and provide mechanical positioning support to said inner conductor junction fitting and said second inner conductor element, where the second contact spring is fitted between the innermost surface of said groove and the inner surface of said second inner conductor element.

15. The inner conductor junction fitting of claim 1, further comprising a first circumferential groove in which a first nonconductive element can rest between and provide mechanical positioning support to said inner conductor junction fitting and said second inner conductor element.

16. The inner conductor junction fitting of claim 1, further comprising a second circumferential groove in which a second nonconductive element can rest between and provide mechanical positioning support to said inner conductor junction fitting and said second inner conductor element.

17. The apparatus for joining coaxial line sections of claim 1, further comprising an anchor insulator captured between recesses in said first and second outer conductor flanges and so shaped and positioned as to hold the inner conductor junction fitting centered within the coaxial apparatus.

18. The apparatus for joining coaxial line sections of claim 1, further comprising an anchor insulator whose outer perimeter fits generally within a recess in said first outer conductor flange and which anchor insulator can be retained therein by the configuration of the second outer conductor flange when the two flanges are brought together as they are when assembled, said anchor insulator being so shaped and positioned as to hold the inner conductor junction fitting substantially centered within the coaxial apparatus and substantially constrained longitudinally.

19. The apparatus for joining coaxial line sections of claim 1, further comprising an anchor insulator whose outer perimeter fits generally within a recess in said second outer conductor flange and which anchor insulator can be retained therein by the configuration of the first outer conductor flange when the two flanges are brought together as they are when assembled, said anchor insulator being so shaped and positioned as to hold the inner conductor junction fitting substantially centered within the coaxial apparatus and substantially constrained longitudinally.

20. An apparatus for connecting segments of coaxial high-power radio frequency (RF) signal conductors, comprising:

means for coupling inner conductor elements of the coaxial lines electrically and mechanically;

means for compensating for longitudinal motion between the coupled inner conductor elements;

means for electrically coupling outer conductor elements of the coaxial lines; and means for compensating for diameter irregularities in the outer surface of the inner conductor coupling means with offsetting diameter alterations in the inner surface of the outer conductor coupling means.

21. The RF signal conductor connecting apparatus of claim 20, further comprising means for maintaining structural integrity from segment to segment of the coaxial line outer conductors.

22. The RF signal conductor connecting apparatus of claim 20, further comprising means for establishing a low gas flow rate across the boundary established by said coupling means.

23. The RF signal conductor connecting apparatus of claim 20, further comprising means for minimizing variation in impedance with changes in longitudinal position of the movable inner conductor element in the vicinity of an intersegment connection.

24. The RF signal conductor connecting apparatus of claim 23, further comprising means for establishing a longitudinally extensible electrical joint wherein a spring contact provides an electrical path that bypasses the extensible portion of the joint to keep the electrical shape and dimensions of the area exposed to RF from changing appreciably as the extensible portion of the joint moves.

25. A method for joining coaxial signal conductors, comprising:

coupling the elements that comprise the inner conductor using joints that permit relative axial travel on one side of the coupling plane to afford compensation for differential expansion between inner and outer conductors;

maintaining a substantially unchanging electrical profile at the site of longitudinal travel of the moving element of the inner conductor through positioning of a spring assembly to shield the end of the moving element from RF for all positions of the moving element;

coupling the elements that comprise the outer conductor using structurally robust mounting flanges indissolubly attached to the outer conductor elements being coupled; and shaping the internal profile of the outer conductor mounting flanges in such fashion that the profile introduces impedance variations that mirror and compensate for those introduced by the external profile variations of the inner conductor coupling elements.

26. The joining method of claim 25, further comprising bonding the inner conductor element on the nonexpanding side of the joining plane to the inner conductor connecting element in such fashion as to establish a nonsliding joint between those elements.

27. The joining method of claim 25, further comprising linking the inner conductor connecting element to the flange joint by establishing a connection between the inner conductor connecting element and an anchor insulator that retains the inner conductor connecting element radially at a point substantially centered within the region defined by the outer flange elements, and that provides axial support for retaining the inner conductor connecting element longitudinally when the spacer is held between the joined flange elements by recesses established in the flange elements for that purpose.

* * * * *

UNITED STATES PATENT AND TRADEMARK OFFICE
CERTIFICATE OF CORRECTION

PATENT NO. : 6,712,644 B1
DATED : March 30, 2004
INVENTOR(S) : Willaim A. DeCormier It is certified that error appears in the above-identified patent and that said Letters Patent is hereby corrected as shown below:

<u>Title page,</u>
Item [57], ABSTRACT,
Line 1, after "A" insert -- coaxial --.

<u>Column 7,</u>
Line 4, replace "scaling" with -- sealing --.

Signed and Sealed this

Twenty-third Day of November, 2004

JON W. DUDAS
*Director of the United States Patent and Trademark Office*